SYNCHRONIZING APPARATUS

Filed May 31, 1962

6 Sheets-Sheet 1

INVENTORS
JAMES R. KERSEY
HAROLD R. OETERS
ROBERT M. TOMASULO
FREDERICK M. TRAPNELL, JR.

BY Gunter A. Hauptman

ATTORNEY

Aug. 9, 1966 J. R. KERSEY ET AL 3,266,024

SYNCHRONIZING APPARATUS

Filed May 31, 1962 6 Sheets-Sheet 4

RECEIVE

United States Patent Office 3,266,024
Patented August 9, 1966

3,266,024

SYNCHRONIZING APPARATUS

James R. Kersey and Harold R. Oeters, Poughkeepsie, and Robert M. Tomasulo, Staatsburg, N.Y., and Frederick M. Trapnell, Jr., Winchester, England, assignors to International Business Machines Corporation, New York, N.Y., a corporation of New York Filed May 31, 1962, Ser. No. 198,841
4 Claims. (Cl. 340—172.5)

Figures 1, 2A:
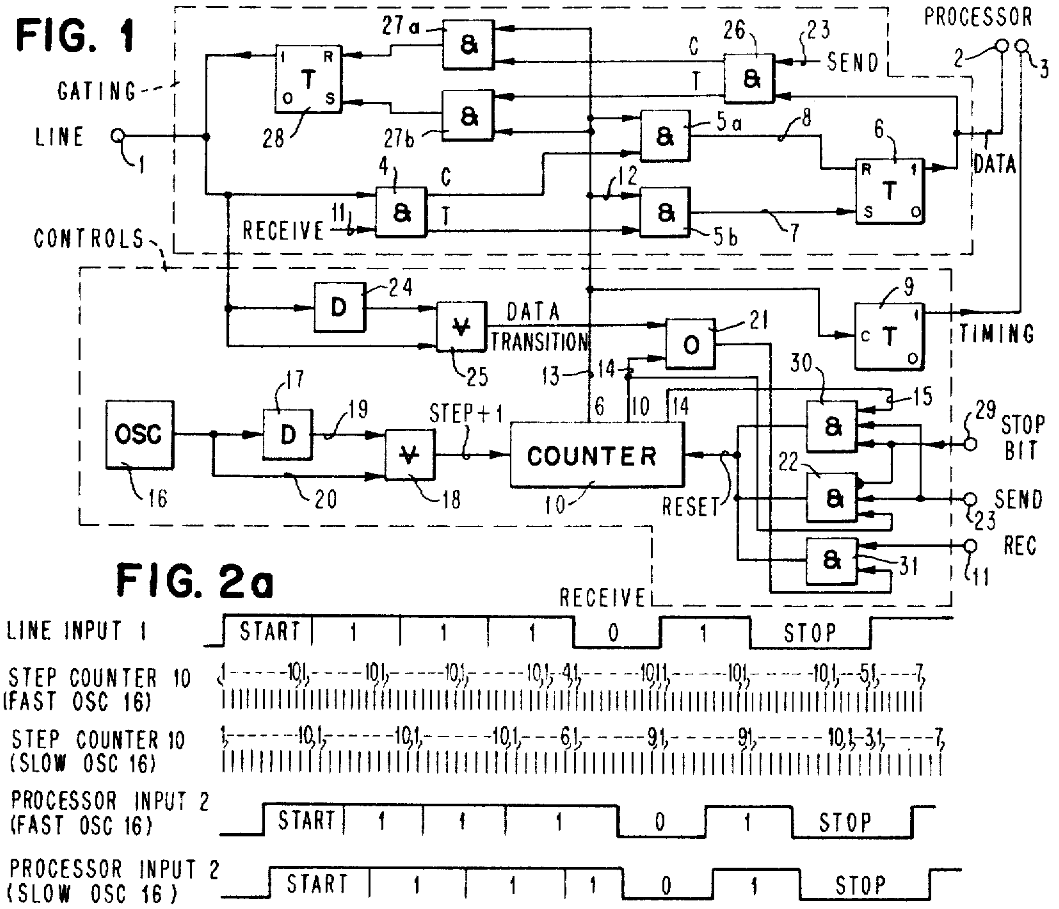

This invention relates to electronic apparatus. More particularly, this invention relates to apparatus controlling the receiving and sending of information.

Information represented by electrical signals is often transferred between one, or more, terminals and a processor. For example, data may be transferred in either direction between a punched-card reader and a computer. The terminals can use information, and make information available, for only short periods of time. Therefore, the processor must be ready to receive information when a terminal offers it, and to send information when a terminal is ready to use it, or the information will be lost. In one prior art scheme, the processor and the terminals operate in synchronism, extra control signals being provided with each interchange of data to insure that the processor is ready when the terminals are. This scheme is expensive because it requires two information channels, one for data and the other for control signals.

In another prior art scheme the information channel is omitted by providing apparatus for recognizing the presence of data. The processor and the active terminals are activated when data interchange starts and are deactivated when data interchange is completed. For example, in the printing telegraph code each character begins with a start bit (one-bit) and ends with a stop bit (zero-bit) which, together with five intervening code bits (one-bit and zero-bits), comprise a character. In receiving a series of identical bits which are manifested by abutting signals of like polarity appearing as one long signal of a single polarity. A single long signal may be recognized as being a series of shorter abutting signals by sampling the long signal at regular intervals calculated to occur at substantially the center of each shorter signal being received. This requires a clock which is accurately synchronized with the received signals. Clock synchronization is usually performed by recognizing the start bits and stop bits. Though this scheme is very useful for handling randomly arriving printing telegraph start-stop characters, it does not insure that each code bit within the character is recognized since the processor and terminals may go out of synchronization between the times that the start bit and stop bit are recognized.

Another problem arises as a result of the elongated (by 40%) stop bit usually used in the start-stop telegraph code. Expensive additional equipment is required in the prior art to transmit this longer bit.

It is therefore an object of the invention to synchronize a processor and a number of terminals during the interchange of data.

Still another object of this invention is to provide apparatus for synchronizing a processor and terminals more than once during the duration of a data character.

It is another object of this invention to provide apparatus for controlling the sending and receiving of information.

Another object is to synchronize information controlling apparatus with randomly received information.

A further object of this invention is to sample randomly received information.

Still another object is to provide apparatus for determining the approximate center of randomly received signals.

An additional object of this invention is to provide apparatus for recognizing individual ones of a series of identical abutting signals.

Another object is to determine the approximate center of individual ones of a series of identical abutting signals.

It is an additional object of this invention to reconstruct randomly received information.

A further object is to provide apparatus for reconstructing randomly received information in accordance with samples of the information.

Another object is to receive random signals, recognize individual ones of a series of similar abutting received signals, sample signals at their approximate center, and reconstruct the received information in accordance with said samples.

It is still another object of this invention to control the length of the transmitted signals.

An additional object is to provide inexpensive apparatus for increasing the length of selected signals, during transmission, relative to a normal signal length.

The foregoing and other objects, features and advantages of the invention will be apparent from the following more particular description of the preferred embodiments of the invention, as illustrated in the accompanying drawings.

These and other objects of the invention may be achieved by means of a counter and a data-transition recognition circuit. During reception of start-stop telegraph signals, the counter is initially set to the decimal value one, and is then incremented approximately ten times for each received bit. When the counter reaches the decimal value six, the line is sampled; when the counter reaches ten, it is reset to one. If a change in polarity of the input signal occurs (from a one-bit to a zero-bit or vice versa) the counter is reset to one no matter what the current count is. As a result, if a series of alternate polarity signals are received each will be sampled at exactly the same point, since the counter is reset at the beginning of each bit. If a series of identical polarity signals are received each will be sampled at a slightly different point, the amount of change depending upon the difference between the time the counter reaches ten (and is reset) and the actual time at which the long signal represents a new bit. Since a signal transition always occurs at least once during every seven-bit start-stop character (the stop bit is a zero-bit and the start bit is a one bit), the amount of tolerable error is quite large even in the worst possible case. In either case, a long signal is broken into component shorter signals which are sampled at their approximate centers. During transmission of start-stop characters, a new bit is initiated every time that the counter contains a six since, normally, the counter is reset to one when it reaches ten, each transmitted bit is ten "units" long. When an elongated stop is to be sent the counter is, instead, reset when it reaches fourteen. The interval between successive bits (initiated at a count of six) is therefore increased by 40%.

In the figures:

FIGURE 1 is a logic diagram showing circuitry embodying the invention.

Figure 2B:
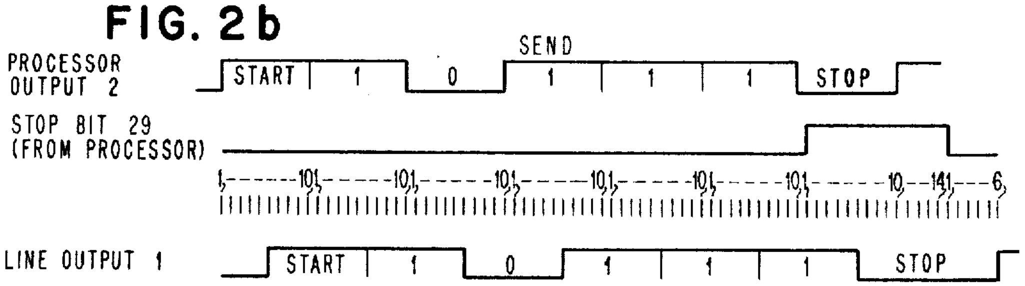

FIGURES 2*a* and 2*b* are pulse diagrams used to illustrate the operation of the circuit shown in FIGULRE 1.

Figures 3A, 3D:
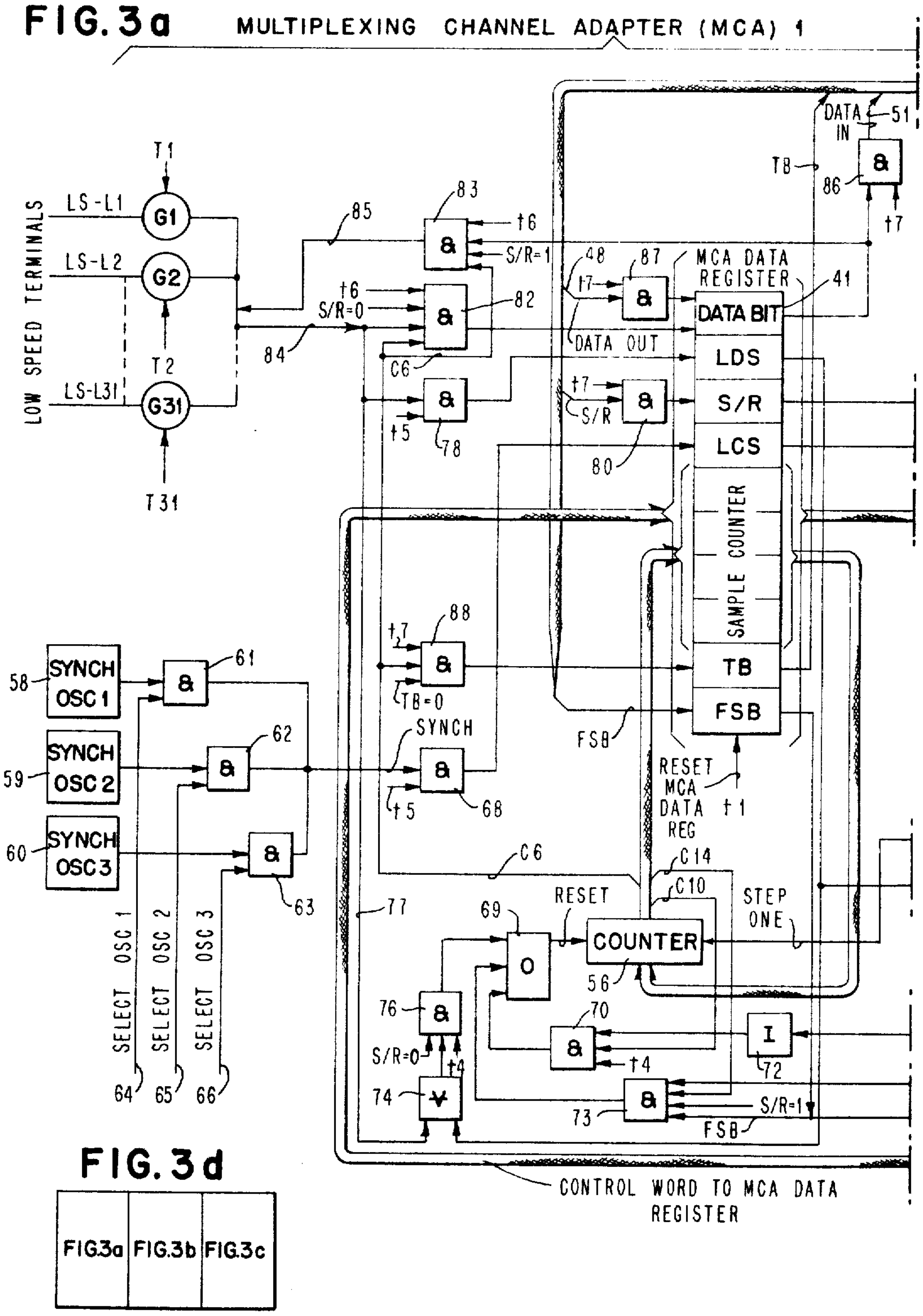
Figure 3B:
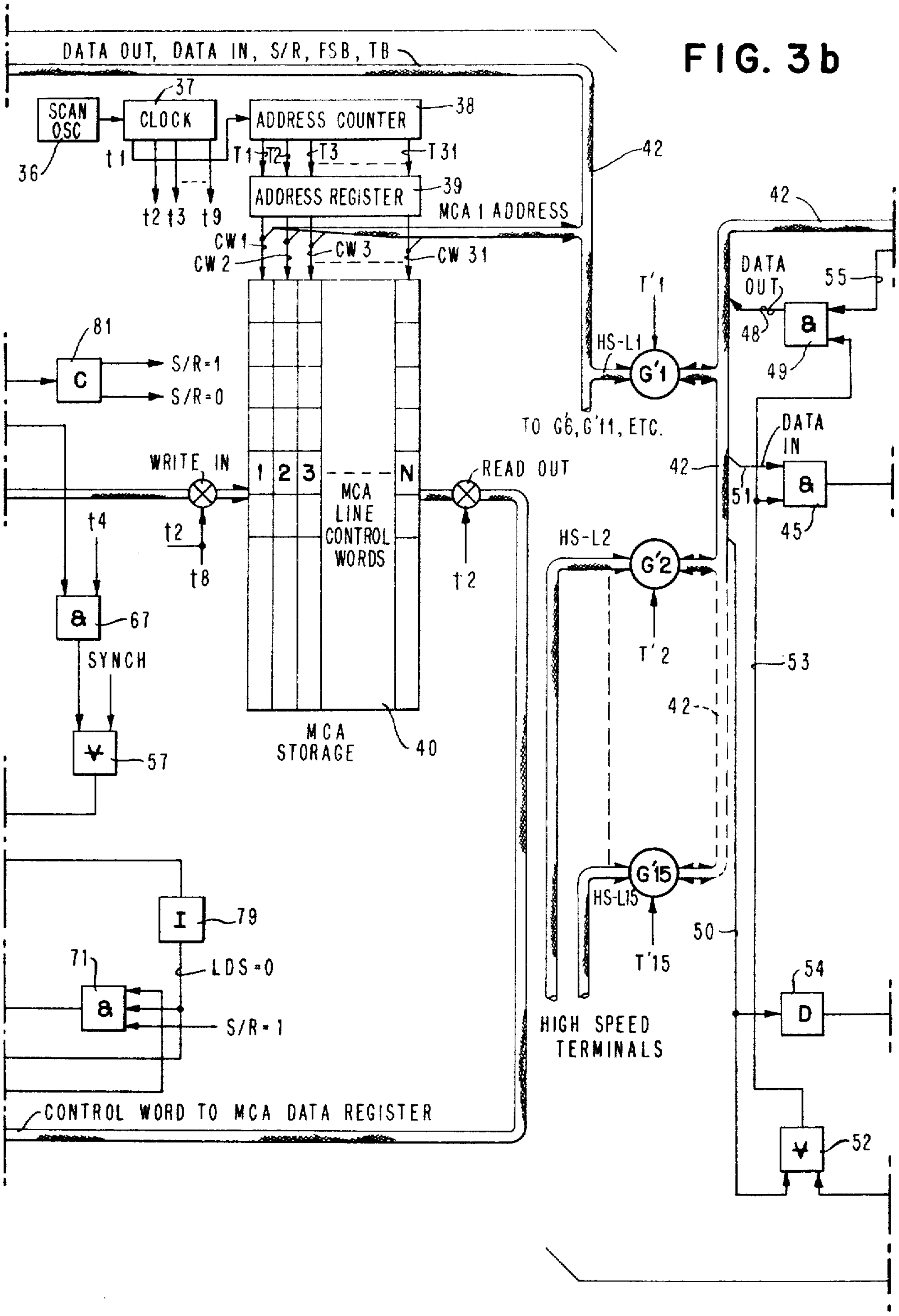
Figure 3C:
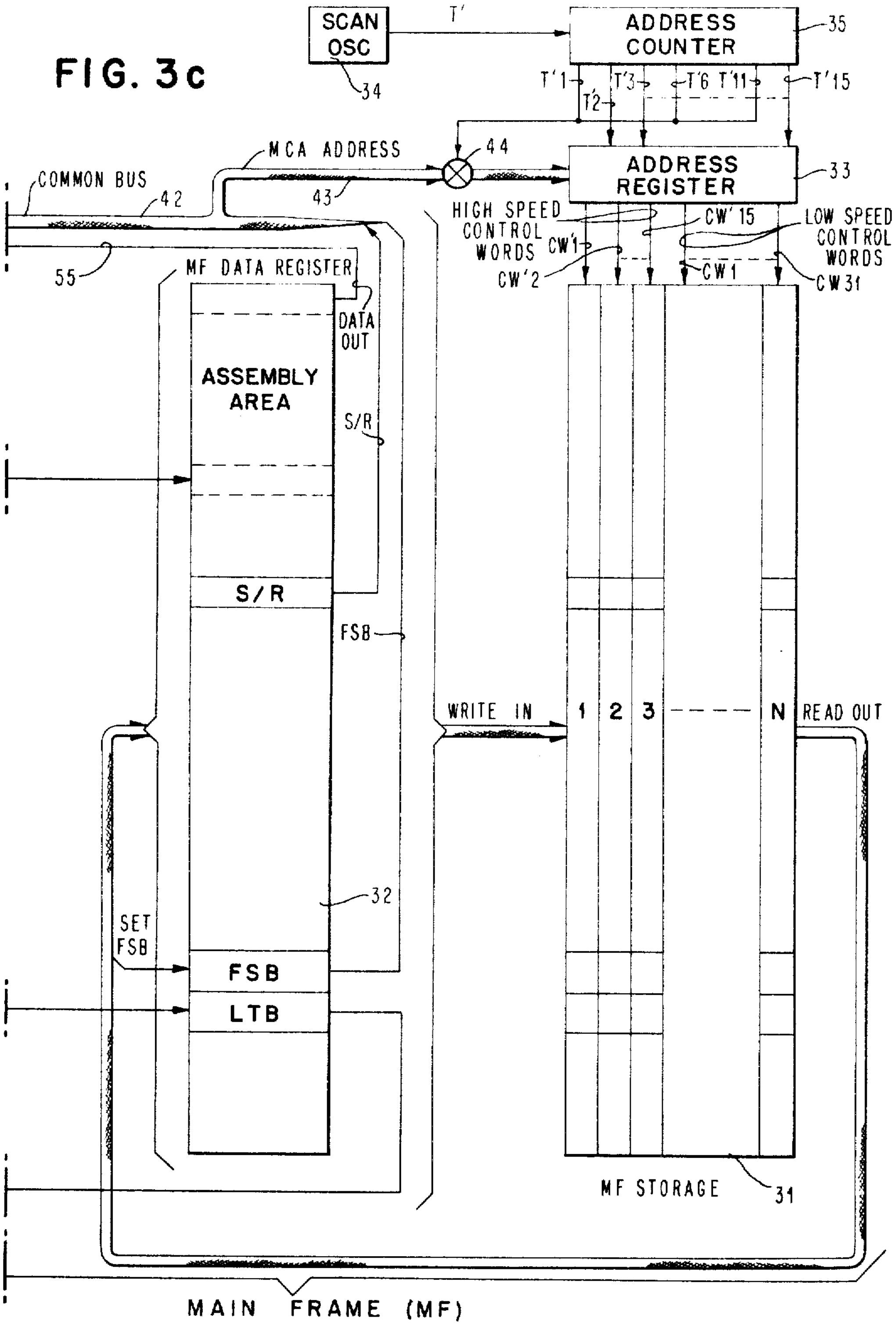

FIGURES 3*a*, 3*b*, and 3*c*, when arranged as shown in FIGURE 3*d*, form a logic diagram of apparatus which illustrates an application of the invention embodied in the circuitry shown in FIGURE 1.

Figure 4A:
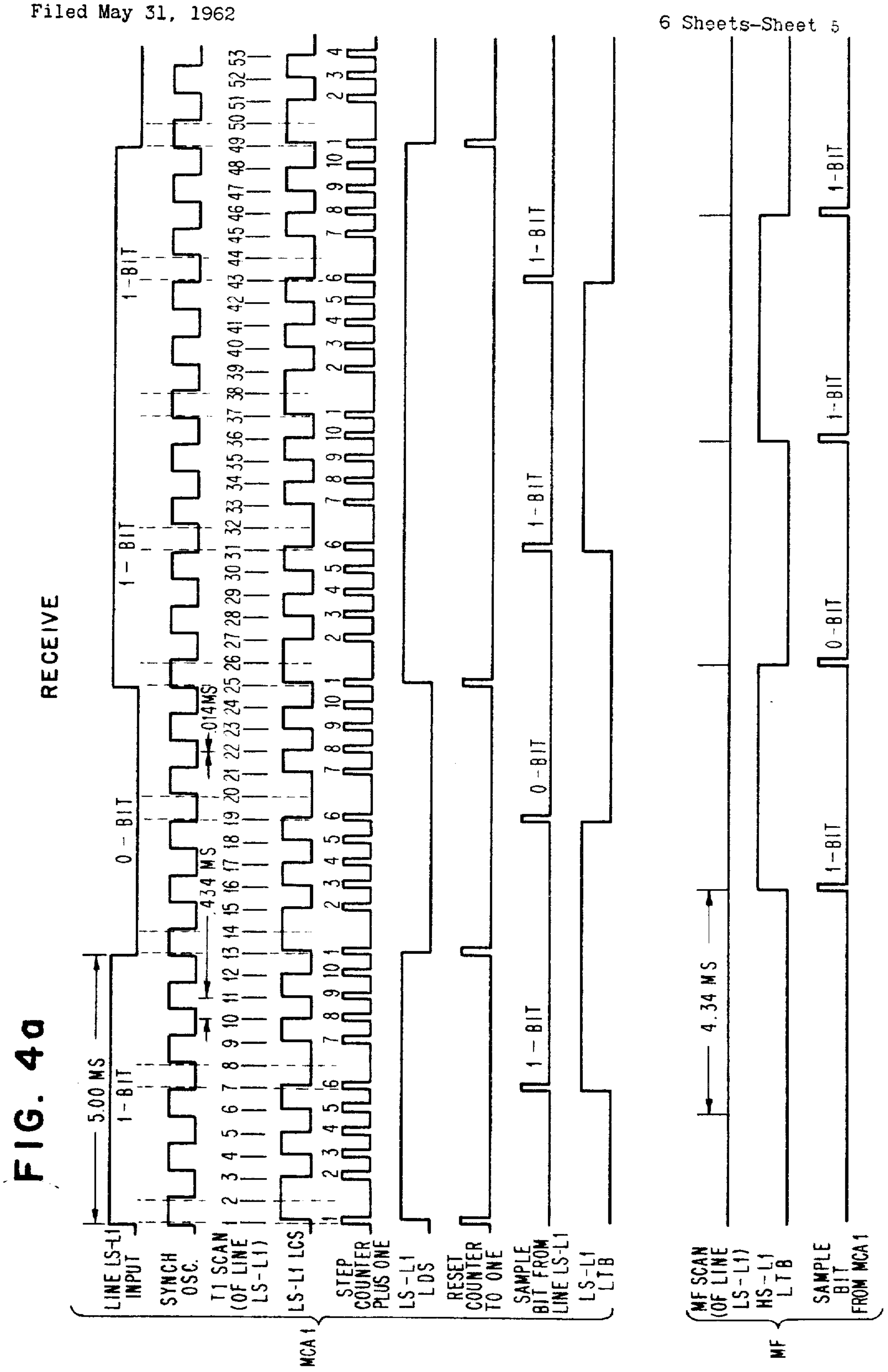
Figure 4B:
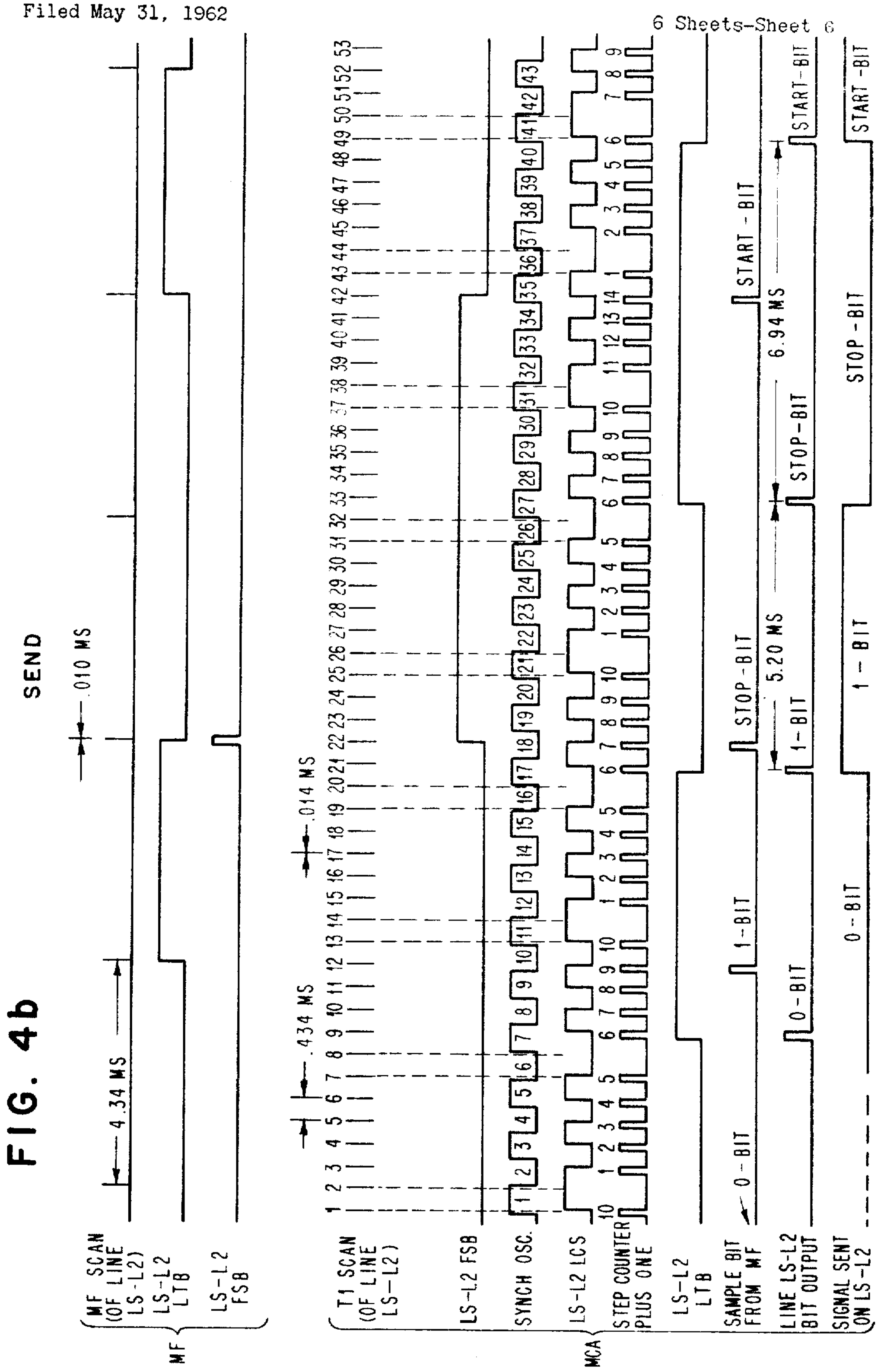

FIGURES 4*a* and 4*b* are pulse diagrams illustrating the operation of the apparatus shown in FIGURES 3*a* through 3*d*.

GENERAL DESCRIPTION

Referring to FIGURE 1, circuitry embodying the invention will now be described. Standard logic block circuits, represented by well-known symbols, are used. The complement of the normal (true) output of some logic blocks are used. In these cases the letters C (complement) and T (true) indicate the function. Information manifested by a serial train of signals is communicated between a line terminal 1 and a processor data terminal 2 and timing terminal 3. The signals, each of which may have either negative or positive polarity, manifest a coded group of bits. For purposes of simplicity the standard printing telegraph start-stop characters comprising a start bit, five data bits and an elongated stop bit are assumed to be used. In this code the start bit is represented by a one-bit, the stop-bit by a zero-bit and the remaining five bits are coded to represent numbers, letters and symbols. The line terminal 1 may receive information which is transferred to the processor via data terminal 2. The timing terminal 3 in this case indicates to the processor the presence of information signals at the data terminal 2. The line terminal 1 may send information signals transferred to it from the data terminal 2. A stop bit terminal 29 is, in this case, used to indicate the occurrence of a stop-bit signal at the data terminal 2.

Information signals received from the line terminal 1 are transferred to the data terminal 2 via an AND circuit 4, AND circuits 5*a* and 5*b* and a trigger 6. When the receive input 11 is activated AND circuit 4 transfers all signals applied to it by the line 1 to AND circuit 5*b* in their true form and to AND circuit 5*a* in an inverted form. For example, assuming a signal on line 13, if the line 1 applies an information signal equivalent to the binary value one (a one bit), a one-bit signal will appear at AND circuit 5*b* output 7 and a zero-bit signal will appear at AND circuit 5*a* output 8. The triger 6 "remembers" the AND circuits 5*a* and 5*b* outputs. Every time that a signal appears at the input of the AND circuit 4, a signal appears at one, and only one, of the outputs 7 or 8. Thus, if, as above, a one is applied to the AND circuit 4, the trigger 6 is set to the one state by the one-bit signal on AND circuit 5*b* output 7 which is connected to the trigger 6 at its S input. If a zero-bit signal had been applied to the AND circuit 4, a binary one would have appeared at AND circuit 5*a* output 8 causing the trigger 6 to be set to the zero state. It is evident that a series of binary ones received at the line terminal 1 will cause the trigger 6 to remain set to the one state without interruption until a binary zero is received.

Each application of a signal from the line 13 (which is explained below) to the complement (C) input of the trigger 9 causes its state to be reversed. Since a signal on line 13 enables AND circuits 5*a* and 5*b*, there will be a signal change at the timing terminal 3 every time that the AND circuits 5*a* and 5*b* are enabled to pass a binary signal. This change will occur even though the input line 1 receives a series of identical abutting binary signals having a constant polarity which cause the trigger 6 to remain set to one of its two possible states. Thus, a signal change at the timing terminal 3 indicates that a constant signal at the data terminal 2 in fact represents a series of binary signals.

The signal applied at the input line terminal 1 may be present for a substantial period before it is passed through the AND circuits 5*a* and 5*b*. The exact time at which the AND circuits 5*a* and 5*b* are activated is determined by a counter 10. The counter 10 stores as electrical states a quantity equal to the number of times that a signal has been applied to the input step +1 following the application of a signal at the reset input. A signal at the reset input causes the counter to be set to a quantity equivalent to the decimal value one. Each subsequent application of a signal at the step +1 input increases the decimal value of the quantity stored in the counter 10 by one. The counter 10 may count to any decimal value, it being assumed for purpose of description only that the maximum count is fourteen. When the counter contains the decimal equivalent of the number six, ten or fourteen, a signal will appear on one of the corresponding lines 13, 14 or 15. For example, every time that the counter 10 contains the equivalent of the decimal value six a signal will appear at its output line 13 causing a signal to be applied to AND circuits 5*a* and 5*b* and to the complement input C of trigger 6. If signals are being received from the line terminal 1, there will be signals at the input of either AND circuit 5*a* or 5*b*. As a result, whatever signal is present at the line terminal 1 will be passed through one of the AND circuits 5*a* and 5*b* to the trigger 6. Simultaneously the trigger 9 is reversed. The counter 10 output 13 activates the AND circuits 5*a* and 5*b* at time calculated to select the approximate center of each signal received at the line terminal 1 in order to prevent receipt of unwanted noise signals.

The counter 10 step +1 input receives signals from an oscillator 16 which operates at a rate greater than the rate at which information is received at the line terminal 1. For purposes of explanation, it may be assumed that the oscillator generates a signal effective to step the counter 10 approximately ten times for each binary information signal received at the line terminal 1. A delay circuit 17 and an Exclusive-OR circuit 18 are illustrative of devices which may be used to recognize the occurrence of an oscillator 16 signal which is intended to step the counter 10. The Exclusive-OR circuit will permit a signal at the step +1 input of the counter 10 whenever any one of its inputs 19 or 20 is alone activated. Assuming that the oscillator initially supplies a binary one signal, a binary one will initially be applied to the Exclusive-OR circuit 18, input 19 via the delay circuit 17 and directly to input 20. No signal is applied to the line step +1 since an output cannot occur from the Exclusive-OR circuit when both inputs 19 and 20 are the same. A transition of the oscillator 16 signal to a binary zero causes a zero to be applied to the Exclusive-OR circuit 18 input 20 whereas a one will remain at the input 19 for a time determined by the delay 17. Therefore, a signal step +1 will step the counter 10. After a period, which depends upon the length of the delay caused by the circuit 17, the input 19 of the Exclusive-OR circuit 18 will again assume the same value as the input 20 (which is now zero). Therefore the signal on the step +1 line will be removed. The next transition in the oscillator 16 signal (which will be from zero to one) will cause another step +1 signal to be applied to the counter 10.

The counter 10 reset input is normally activated during the reset of information whenever the counter steps to the decimal value ten, via the OR circuit 21 and the AND circuit 31. The AND circuit 31 will pass whatever output is available from the OR circuit 21 when it is gated by the presence of a signal on send line 23 as will be explained below. Assuming that the counter was initially set to the value one at the beginning of the first information signal at the line terminal 1, then if the oscillator 16 steps the counter ten times for each signal at the line terminal 1, the counter 10 will be reset to the value one when the beginning of the next information signal appears at the line terminal 1. Thus, the decimal six output 13 of the counter 10 causes each signal appearing at the line terminal 1 to be sampled by the AND circuits 5a and 5b at its approximate center. Since the oscillator 16 cannot be assumed to be in absolute synchronism with the signal arriving at the line terminal 1, it may be that the time when the counter 10 reaches the value ten may not be the time that a new bit starts. As a result the new bit will not be sampled at its center. Therefore, additional circuitry (described in the next paragraph) is provided to reset the counter 10 at proper times other than when it contains the quantity ten.

During the receipt of information at the line terminal 1, the delay circuit 24 and Exclusive-OR circuit 25 are used to recognize the occurrence of transitions in the information signals applied at the line terminal 1. Since it is desired that the counter 10 be reset at the beginning of each new bit, it follows that the counter 10 should be reset at each information signal transition. Therefore, the recognition of an input signal transition is utilized to reset the counter 10 even though it does not currently indicate the decimal value ten, which is the normal reset point during receipt of information at the line terminal 1. Whatever signal is currently at the terminal 1 is applied to both the delay circuit 24 and the Exclusive-OR circuit 25. As previously described with reference to the delay circuit 17 and the Exclusive-OR circuit 18, the Exclusive-OR circuit 25 will (via the OR circuit 21 and the AND circuit 31) reset the counter 10 to contain a value one whenever the information at line terminal 1 changes from either the binary value zero to the binary value one or vice versa. For example, if a series of binary ones are received at line terminal 1, the counter 10 will normally be reset every time that the contents have a value ten. Depending upon the rate of the oscillator 16, these reset points may or may not exactly coincide with the beginning of each binary one received at input terminal 1. If, in this example, a binary zero is received following the series of binary ones, there will be a data transition output from the Exclusive-OR circuit 25 which will cause the counter 10 to be reset to contain a one at a time exactly coinciding with the transition from the series of ones to the zero. If the counter 10 is at this time set to indicate the decimal value ten, the recognition of the transition point has no effect since the counter 10 would be reset at this time anyway. However, if the counter 10 contains some other number, either higher or lower, it will be reset at this time, thus being "synchronized" with the incoming information at line terminal 1.

During sending of data from the data terminal 2 to the line terminal 1, the AND circuit 26, the AND circuits 27a and 27b and the trigger 28 are utilized in the same manner as was previously described with reference to the AND circuit 4, AND circuits 5a and 5b and trigger 6. Signals present at the data terminal 2 are sampled by the AND circuits 27a and 27b whenever the counter 10 contains the decimal value six to operate the trigger 28 which applies signals to the line terminal 1. The counter 10, in this case, operates to control the length of information signals sent from the line terminal 1. Since the trigger 28 may be changed only when the counter 10 contains the decimal value six, the time between successive occurrences of this condition determines the width of the signal applied at the line terminal 1. It is obvious that the point at which the counter 10 is reset determines the time between successive occurrences of the decimal value six. Normally the counter 10 is reset via the AND circuit 22 each time that it contains a decimal value ten and is properly gated by send line 23. When, however, it is desired to lengthen an information signal applied to the line terminal 1 (as occurs with the "stop bit" in the telegraph code, which is 40% longer than other information signals), the counter 10 is not reset when it contains a ten but rather when it contains a fourteen. If an elongated stop bit is to be sent, signals are applied to data terminal 2 and to stop bit line 29. The signal (zero bit) at data terminal 2 is passed at count six to the trigger 28, resetting it to the zero state if it was not already in this state. The signal on stop bit line 29 inhibits the resetting of the counter 10 via AND circuit 22 and enables an AND circuit 30 (assuming AND circuit 30 is properly gated by send line 23) which resets the counter 10 when the counter 10 contains the decimal value fourteen. In this manner, the telegraph stop bit may be elongated by 40% since the counter 10 will not again contain the decimal value six until a time 40% later than it would normally occur. Therefore, the trigger 28 cannot be changed (by the start bit of the next character) until a time 40% later than usual. It is obvious that the amount of elongation can be changed simply by recognizing different counter quantities.

The operation of the circuit shown in FIGURE 1 will now be described with reference to the pulse diagrams of FIGURES 2*a* and 2*b*. Referring first to FIGURE 2*a*, there are shown the information signals present at the line terminal 1 and the resultant signals transferred to the processor data terminal 2 as a result of an oscillator 16 rate which is in a first case too fast, and in a second case too slow. A typical printing telegraph code character, comprising a start signal, five information signals and a stop signal is shown. The start signal always has a binary value of one and the stop signal always has a binary value of zero and is in addition a minimum of 40% longer in duration than the start signal. The five information bits may be either of binary value one or zero, depending upon what information is represented, and each has a duration equal to a start signal. It can be seen from FIGURE 2*a* that a series of signals having the same binary value appear as one long constant polarity signal. Ideally, the oscillator 16 operates at a rate effective to step the counter 10 ten times during the duration of one information bit at the line terminal 1. In FIGURE 2*a*, there are shown the stepping pulses applied to the counter 10 when the oscillator is operating too quickly, causing the counter 10 to be stepped eleven times during each input bit when the oscillator 16 is running too slowly, causing the counter 10 to be stepped only nine times during each input bit.

Still referring to FIGURE 2*a* and assuming the first case where the oscillator 16 is operated at a rate greater than the bit rate of the information at line terminal 1, the transfer of signals to the data terminal 2 will be described. Initially, the binary one signal of the start bit is passed to the delay circuit 24 and to one input of the Exclusive-OR circuit 25. Since the previous value of the signal at the line terminal 1 had a binary value zero, the inputs to the Exclusive-OR circuit will be different and a signal will be applied to the counter 10 reset input via OR circuit 21 and AND circuit 31, causing the counter 10 to be set to the decimal quantity one. During receipt of information from the line terminal 1, a signal is applied to the receive line 11. As a result the start bit one signal is passed through the AND circuit 4 output to the AND circuit 5b. The trigger 6 which was initially set to the zero state remains set to this state since no output emerges from the AND circuit 5b at this time. The oscillator 16 applies stepping signals to the counter 10 via the delay circuit 17 and the Exclusive-OR circuit 18 at regular intervals as shown in FIGURES 2*a*. When the counter 10 is stepped to indicate the decimal quantity six, a signal appears on line 13 enabling AND circuit 5b via line 12.

A signal emerges from the AND circuit 5*b* via line 7 causing the trigger 6 to be set to the one state. As a result, the signal at the data terminal 2 changes from the binary value zero to the binary value one. The trigger 9 is at this time reversed, by the signal on line 13, so as to indicate at the timing terminal 3 that a new bit has been placed at the data terminal 2. The oscillator 16 continues stepping the counter 10. When the counter 10 reaches the decimal value ten, the counter is reset to the decimal value one via the OR circuit 21 and the AND circuit 31. Since the oscillator is running faster than the incoming information bit rate, this reset occurs before the end of the start bit. The next time that the counter 10 is stepped to the decimal value six, a signal will again be applied to the AND circuit 5*b*. Since the signal at the terminal 1 has not changed (though it now represents the first information bit following the start bit), the trigger 6 will remain set to the one state. The trigger 9 will, however, be reversed to indicate at timing terminal 3 that the signal at the data terminal 2 now represents another bit. Note that the counter 10 did not reach the decimal value six at the same point of this received bit as it did for the previous received bit since the counter is out of synchronization with the input. The counter will repeatedly step to the decimal value six causing the trigger 9 to be reversed each time so as to indicate that the constant value signal at the data terminal 2 represents different information bits. Since the oscillator 16 is running faster than the rate at which bits are received at the line terminal 1, the AND circuit 5*b* will be sampled earlier during each successive bit.

During the receipt of the fourth bit (the third information bit following the start bit), at the time that the counter 10 is stepped to the decimal value four, the signal at the line terminal 1 changes polarity to the binary zero value. Due to the action of the delay circuit 24, the inputs to the Exclusive-OR circuit 25 will be opposite to each other causing a data transition signal to be applied to the AND circuit 31 via the OR circuit 21. The output of AND circuit 31 resets the counter 10 to the value one. The counter 10 is now in synchronism with the information received at the line terminal 1. The oscillator 16 will continue stepping the counter 10 up from the value one. The zero bit at line terminal 1 causes a signal to appear at AND circuit 4 output C which is applied to the AND circuit 5*a*. When the counter 10 reaches the value six a signal is applied to AND circuit 5*a* via line 13 enabling it to pass a signal to line 8 which resets the trigger 6 to the zero state. A signal applied at the data terminal 2 will not have the binary value zero. The trigger 9 is reversed as usual to indicate that there is a new information bit at the data terminal 2.

The oscillator 16 will continue stepping the counter 10. When the counter again contains the decimal value 10, it is reset to the value one state via the OR circuit 21 and the AND circuit 31 as usual. At this time the line terminal 1 input changes to the binary value one causing the counter 10 to be again reset via the Exclusive-OR circuit 25, the OR circuit 21 and the AND circuit 31. When the counter 10 is stepped to indicate the decimal value six, the trigger 6 will be set to the one state via the AND circuit 5*b*. The counter 10 is repeatedly stepped, being reset to the value one when it reaches the decimal value 10. Subsequent to this reset of the counter 10, the signal at the line terminal 1 again assumes the binary value zero (the stop bit) which causes another reset of the counter 10 via Exclusive-OR circuit 5, bringing it into synchronism with the input information. When the counter 10 assumes the decimal value six, the trigger 6 is reset to this one state to place the binary value zero at the data terminal 2. The counter 10 continues being stepped and is reset at the decimal value one when it reaches the decimal value ten. Since the stop bit is 40% longer than the other bits of the information received at the line terminal, counter 10 will reach the decimal value four before the line terminal 1 assumes the binary value one representing the start bit of the next start-stop telegraph character. At this time the counter 10 is again reset to indicate the decimal value one via the Exclusive-OR circuit 25.

Still referring to FIGURE 2*a*, it now is assumed that the oscillator 16 runs slower than the information received at the line terminal 1. The initial transition from the binary value zero to the binary value one of the start bit causes the counter 10 to be reset to the decimal value one via the Exclusive-OR circuit 25, the OR circuit 21, and the AND circuit 31. When the counter has been stepped to the decimal value six the AND circuit 5*b* output 7 will cause the trigger 6 to change from its initial state of zero to the one state. The signal at the data terminal 2 as a result changes from zero to one and a transition occurs at the timing terminal 3 as a result of the reversal of the trigger 9. The counter 10 is repeatedly stepped by the oscillator 6 until it contains the decimal value ten (only nine steps over the initial value of one). At this time a new information bit arrives at the line terminal 1, but since this has the same binary value at the start bit the counter will continue to be stepped. When the counter reaches the decimal value 10, which occurs at the beginning of the second information bit, the counter 10 will reset to the decimal value one via the OR circuit 21 and the AND circuit 31. When the counter 10 is next stepped to the decimal value six, the AND circuit 5*b* is again sampled. Since the information at the line terminal 1 still has the binary value one, the trigger 6 will not be changed. The trigger 9 will however be reversed to indicate that the signal at the data terminal 2 represents another information bit. Note that the second information bit received is sampled later in time than was the start bit. During subsequent received bits having binary values of one, each one will be sampled at a successively later time because the oscillator is not synchronized with the incoming signals at the line terminal 1. After the receipt of the fourth bit (the third information bit following the start bit), however, the signal at the line terminal 1 will change from a binary one to a binary zero causing an output from the Exclusive-OR circuit 25 which will reset the counter 10 at the decimal value one. Thus the counter 10 is again synchronized with the information at the line terminal 1. Subsequently, the counter is again stepped by the oscillator 16. As previously described, each time that the counter 6 reaches the decimal value six one of the AND circuits 5*a* or 5*b* will cause a signal to be applied to the trigger 6 and to the trigger 9. The counter 10 will be reset only via the Exclusive-OR circuit 25 if the counter 10 does not reach the decimal value ten (as occurs during the receipt of the fifth and sixth bit) due to the inadequate speed of the oscillator 16. The stop bit (binary value zero) when applied to the line terminal 1, remains 40% longer than any of the previous bits. Therefore, the counter 10 is stepped to the decimal value ten and is then reset via the line 14 to the OR circuit 21. The counter 10 will again be reset when the end of the stop bit is reached via the Exclusive-OR circuit 25. The trigger 6 will be set to the one state, and the trigger 9 will be reversed, when the counter 10 again contains the decimal value six.

FIGURE 2*b* illustrates the transmission of information bits from the data terminal 2 to the line terminal 1. It is assumed that the processor can apply only equal length bits to the data terminal 2. When it is desired by the processor to elongate the bit it is necessary to supply an extra stop bit. The rate at which the oscillator 16 runs determines the length of each transmitted bit. Initially, the send line 23 is activated and the receive line 11 is deactivated. The appearance of a binary one at the data terminal 2 causes the AND circuit 26 output T to apply a signal to the AND circuit 27*b*. The trigger 28 remains set to its initial zero state, however, since there is no output from the AND circuit 27*b* at this time. As a result, the line terminal 1 continues to transmit a binary zero. The oscillator 16 steps the counter 10 repeatedly. When the counter 10 contains the decimal value six, an output will occur from the AND circuit 27*b* causing the trigger 28 to be set to the one state. As a result, the line terminal 1 begins the transmission of a binary one. The signal sent via the line terminal 1 will continue until the counter 10 again reaches the decimal value six. At this time the AND circuits 27*a* and 27*b* are enabled. The trigger 28, however, remains set to the one state since the next binary value present at the data terminal 2 is also a one. The third time that the counter 10 reaches the decimal value six there will be an output from the AND circuit 27*a* causing the trigger 28 to change the line terminal 1 signal from the binary value one to the binary value zero. This occurs because the signal at the data terminal 2 has changed from a binary value one to a binary value zero resulting in a signal at output C of the AND circuit 26. The fourth time that the decimal value six is reached by the counter 10 the trigger 28 will again assume the one state since there is now a binary one at the data terminal 2. The line terminal 1 continues to transmit the binary value one until the seventh time that the counter 10 reaches the decimal value six. At this time the data terminal 2 value changes to a binary zero in accordance with the stop bit that is to be sent to the line terminal 1 and a signal is applied at the stop bit line 29 as shown in FIGURE 2*b*. The signal on the stop bit line 29 is applied to disable AND circuit 22 and enable the AND circuit 30. When the counter 10 reaches the value ten it is not reset because the AND circuit 22 is disabled. Therefore, the oscillator 16 continues incrementing the counter 10 until it reaches the value fourteen. At this time a signal appears at counter 10 output 15 which resets the counter 10 to the value one via the AND circuit 30. This counter is then repeatedly stepped until it reaches the decimal value six at which time the trigger 28 is reset to the one state as a result of the end of the stop bit and the beginning of no next character's start bit. Due to the resetting of this counter 10 after a count of fourteen, instead of the usual count of ten, this stop bit is elongated by 40%.

Refer now to FIGURES 3*a*, 3*b* and 3*c* which, when arranged as shown in FIGURE 3*d*, form a logic diagram showing apparatus using the invention. The apparatus shown is a message switching exchange comprising a main frame (MF) and one or more multiplexing channel adapters (MCA) of which only one is shown. The main frame is explained in detail in copending application Serial No. 196,671, filed May 22, 1962, R. M. Tomasulo et al., "Memory Allocation" (IBM Docket No. 7555) assigned to the International Business Machines Corporation, which is incorporated herein by this reference. Briefly, the main frame comprises a storage 31 for holding control words which are brought out to a data register 32 one at a time in a regular sequence under the control of an address register 33. An oscillator 34 (FIG. 3*a*) regularly scans each one of fifteen high speed lines HS–L1 through HS–15 by means of signal T'1 through T'15 from an address counter 35. The same address counter 35 specifies addresses of ones of control words CW'1 through CW'15 in the storage 31 which correspond to scanned lines connected to high speed terminals. Reference is made to the aforesaid Tomasulo et al. application for the details of operation of the main frame.

Each one of the fifteen high speed lines HS–L1 through HS–L15 may be connected to one terminal device, for example, a telegraph transmitter/receiver. The multiplexing channel adapter multiplies the number of terminal units which may be connected to the high speed lines. In the embodiment shown in FIGURES 3*a*, 3*b* and 3*c* each multiplexing channel adapter is connected to thirty-one low speed lines LS–L1 through LS–L31. The one multiplexing channel adapter shown in this embodiment is connected to three of the high speed lines: HS–L1, HS–L6 and HS–L11. In this manner the usual capability of the main frame is increased from 15 terminals to 43 terminals. The main frame control words CW'1, CW'6 and CW'11 usually associated with high speed lines HS–L1, HS–L6 and HS–L11 are not accessed by the address counter 35. Instead, as will be explained below thirty-one "low speed" control words CW1 through CW31 are provided in the main frame storage 35 which are accessed by addresses from the MCA supplied via a gate operated when high speed lines HS–L1, HS–L6 and HS–L11 are scanned. Lines HS–L1, HS–L6 and HS–L11 "service" the thirty-one low speed lines LS–L1 through LS–L31; while the balance of the high speed lines are each connected to one high speed terminal. It is obvious that the more terminals that are connected to a line the slower must be the terminal supplying or receiving information, the multiplexing channel adapter terminals therefore being referred to as slow speed terminals while the main frame lines being referred to as high speed terminals.

In the multiplexing channel adapter each one of the thirty-one low speed lines LS–L1 through LS–L31 is sampled under the control of an oscillator 36 connected to a clock 37 which drives an address counter 38. The oscillator 36 steps the clock 37 through a cycle from *t*1 through *t*9. The address counter 38 is increased by one each time that the clock 37 is set to time *t*1. The output of the address counter is on one of the lines T1 through T31 at any one time. In this manner, one of the low speed lines LS–L1 through LS–L31 is sampled at a one time via one of the gates G1 through G31 which are controlled by corresponding ones of the address counter outputs T1 through T31. During the time that a single low speed line is scanned, the clock 37 steps through nine cycles. The address counter 38 outputs T1 through T31 are also applied to an address register 39 which addresses word locations in the storage 40 causing one control word at a time to be entered into a multiplexing channel adapter data register 41. Since the address register 39 address outputs CW1 through CW31 correspond to the address counter 38 outputs T1 through T31, the MCA control word read from the storage 40 into the data register 41 will always correspond to the particular one of the low speed lines being sampled by the address counter 38 outputs T1 through T31. This portion of the apparatus is similar in operation and construction to the aforesaid Tomasulo et al. application referenced above.

The oscillator 36 in the multiplexing channel adapter and the oscillator in the main frame operate in a timed relationship which is calculated to "connect" each one of the low speed terminals LS–L1 through LS–L31 to the main frame, via one of the three high speed lines HS–L1, HS–L6 and HS–L11 to which the multiplexing channel adapter is connected, at regular intervals. Each time that the main frame scans one of the three high speed lines connected to the MCA, the main frame low speed control word CW1 through CW31 corresponding to the low speed line being scanned at this time by the MCA is brought into the main frame data register 32. The MCA control word for the low speed line is at this time in the MCA data register 41. As a result an information interchange between the two corresponding control words is possible. This interchange is what is meant by the "conversion" of the main frame to a low speed line. The table below illustrates one of the possible timing relationships of the low speed MCA and high speed main frame scanning operations.

TABLE—MAIN FRAME—MCA1 SCANNING RELATIONSHIPS

| A | B | C | A | B | C | A | B | C | A | B | C | A | B | C | A | B | C |
|---|---|---|---|---|---|---|---|---|---|---|---|---|---|---|---|---|---|
| 1 | 14 | 1X | 1 | 448 | | 1 | 882 | 2 | 1 | 1316 | | 1 | 1750 | 3 | 1 | 2184 | |
| 2 | 28 | | 2 | 462 | 2 | 2 | 896 | | 2 | 1330 | 3 | 2 | 1764 | | 2 | 2198 | 4 |
| 3 | 42 | 2 | 3 | 476 | | 3 | 910 | 3 | 3 | 1344 | | 3 | 1778 | 4 | 3 | 2212 | |
| 4 | 56 | | 4 | 490 | 3 | 4 | 924 | | 4 | 1358 | 4 | 4 | 1792 | | 4 | 2226 | 5 |
| 5 | 70 | 3 | 5 | 504 | | 5 | 938 | 4 | 5 | 1372 | | 5 | 1806 | 5 | 5 | 2240 | |
| 6 | 84 | | 6 | 518 | 4 | 6 | 952 | | 6 | 1386 | 5 | 6 | 1820 | | 6 | 2254 | 6X |
| 7 | 98 | 4 | 7 | 532 | | 7 | 966 | 5 | 7 | 1400 | | 7 | 1834 | 6X | 7 | 2268 | |
| 8 | 112 | | 8 | 546 | 5 | 8 | 980 | | 8 | 1414 | 6X | 8 | 1848 | | 8 | 2282 | 7 |
| 9 | 126 | 5 | 9 | 560 | | 9 | 994 | 6X | 9 | 1428 | | 9 | 1862 | 7 | 9 | 2296 | |
| 10 | 140 | | 10 | 574 | 6X | 10 | 1008 | | 10 | 1442 | 7 | 10 | 1876 | | 10 | 2310 | 8 |
| 11 | 154 | 6X | 11 | 588 | | 11 | 1022 | 7 | 11 | 1456 | | 11 | 1890 | 8 | 11 | 2324 | |
| 12 | 168 | | 12 | 602 | 7 | 12 | 1036 | | 12 | 1470 | 8 | 12 | 1904 | | 12 | 2338 | 9 |
| 13 | 182 | 7 | 13 | 616 | | 13 | 1050 | 8 | 13 | 1484 | | 13 | 1918 | 9 | 13 | 2352 | |
| 14 | 196 | | 14 | 630 | 8 | 14 | 1064 | | 14 | 1498 | 9 | 14 | 1932 | | 14 | 2366 | 10 |
| 15 | 210 | 8 | 15 | 644 | | 15 | 1078 | 9 | 15 | 1512 | | 15 | 1946 | 10 | 15 | 2380 | |
| 16 | 224 | | 16 | 658 | 9 | 16 | 1092 | | 16 | 1526 | 10 | 16 | 1960 | | 16 | 2394 | 11X |
| 17 | 238 | 9 | 17 | 672 | | 17 | 1106 | 10 | 17 | 1540 | | 17 | 1974 | 11X | 17 | 2408 | |
| 18 | 252 | | 18 | 686 | 10 | 18 | 1120 | | 18 | 1554 | 11X | 18 | 1988 | | 18 | 2422 | 12 |
| 19 | 266 | 10 | 19 | 700 | | 19 | 1134 | 11X | 19 | 1568 | | 19 | 2002 | 12 | 19 | 2436 | |
| 20 | 280 | | 20 | 714 | 11X | 20 | 1148 | | 20 | 1582 | 12 | 20 | 2016 | | 20 | 2450 | 13 |
| 21 | 294 | 11X | 21 | 728 | | 21 | 1162 | 12 | 21 | 1596 | | 21 | 2030 | 13 | 21 | 2464 | |
| 22 | 308 | | 22 | 742 | 11 | 22 | 1176 | | 22 | 1610 | 13 | 22 | 2044 | | 22 | 2478 | 14 |
| 23 | 322 | 12 | 23 | 756 | | 23 | 1190 | 13 | 23 | 1624 | | 23 | 2058 | 14 | 23 | 2492 | |
| 24 | 336 | | 24 | 770 | 13 | 24 | 1204 | | 24 | 1638 | 14 | 24 | 2072 | | 24 | 2506 | 15 |
| 25 | 350 | 13 | 25 | 784 | | 25 | 1218 | 14 | 25 | 1652 | | 25 | 2086 | 15 | 25 | 2520 | |
| 26 | 364 | | 26 | 798 | 14 | 26 | 1232 | | 26 | 1666 | 15 | 26 | 2100 | | 26 | 2534 | 1X |
| 27 | 378 | 14 | 27 | 812 | | 27 | 1246 | 15 | 27 | 1680 | | 27 | 2114 | 1X | 27 | 2548 | |
| 28 | 392 | | 28 | 826 | 15 | 28 | 1260 | | 28 | 1694 | 1X | 28 | 2128 | | 28 | 2562 | 2 |
| 29 | 406 | 15 | 29 | 840 | | 29 | 1274 | 1X | 29 | 1708 | | 29 | 2142 | 2 | 29 | 2576 | |
| 30 | 420 | | 30 | 854 | 1X | 30 | 1288 | | 30 | 1722 | 2 | 30 | 2156 | | 30 | 2590 | 3 |
| 31 | 434 | 1X | 31 | 868 | | 31 | 1302 | 2 | 31 | 1736 | | 31 | 2170 | 3 | 31 | 2604 | |

| A | B | B | A | B | C | A | B | C | A | B | C | A | B | C |
|---|---|---|---|---|---|---|---|---|---|---|---|---|---|---|
| 1 | 2618 | 4 | 1 | 3052 | | 1 | 3486 | 5 | 1 | 3920 | | 1 | 4354 | 6X |
| 2 | 2632 | | 2 | 3066 | 5 | 2 | 3500 | | 2 | 3931 | 6X | 2 | 4368 | |
| 3 | 2646 | 5 | 3 | 3080 | | 3 | 3514 | 6X | 3 | 3948 | | 3 | 4382 | 7 |
| 4 | 2660 | | 4 | 3094 | 6X | 4 | 3528 | | 4 | 3962 | 7 | 4 | 4396 | |
| 5 | 2674 | 6X | 5 | 3108 | | 5 | 3542 | 7 | 5 | 3976 | | 5 | 4410 | 8 |
| 6 | 2688 | | 6 | 3122 | 7 | 6 | 3556 | | 6 | 3990 | 8 | 6 | 4424 | |
| 7 | 2702 | 7 | 7 | 3136 | | 7 | 3570 | 8 | 7 | 4004 | | 7 | 4438 | 9 |
| 8 | 2716 | | 8 | 3150 | 8 | 8 | 3584 | | 8 | 4018 | 9 | 8 | 4452 | |
| 9 | 2730 | 8 | 9 | 3164 | | 9 | 3598 | 9 | 9 | 4032 | | 9 | 4466 | 10 |
| 10 | 2744 | | 10 | 3178 | 9 | 10 | 3612 | | 10 | 4046 | 10 | 10 | 4480 | |
| 11 | 2758 | 9 | 11 | 3192 | | 11 | 3626 | 10 | 11 | 4060 | | 11 | 4494 | 11X |
| 12 | 2772 | | 12 | 3206 | 10 | 12 | 3640 | | 12 | 4074 | 11X | 12 | 4508 | |
| 13 | 2786 | 10 | 13 | 3220 | | 13 | 3654 | 11X | 13 | 4088 | | 13 | 4522 | 12 |
| 14 | 2800 | | 14 | 3234 | 11X | 14 | 3668 | | 14 | 4102 | 12 | 14 | 4536 | |
| 15 | 2814 | 11X | 15 | 3248 | | 15 | 3682 | 12 | 15 | 4116 | | 15 | 4550 | 13 |
| 16 | 2828 | | 16 | 3262 | 12 | 16 | 3696 | | 16 | 4130 | 13 | 16 | 4564 | |
| 17 | 2842 | 12 | 17 | 3276 | | 17 | 3710 | 13 | 17 | 4144 | | 17 | 4578 | 14 |
| 18 | 2856 | | 18 | 3290 | 13 | 18 | 3724 | | 18 | 4158 | 14 | 18 | 4592 | |
| 19 | 2870 | 13 | 19 | 3304 | | 19 | 3738 | 14 | 19 | 4172 | | 19 | 4606 | 15 |
| 20 | 2884 | | 20 | 3318 | 14 | 20 | 3752 | | 20 | 4186 | 15 | 20 | 4620 | |
| 21 | 2898 | 14 | 21 | 3332 | | 21 | 3766 | 15 | 21 | 4200 | | 21 | 4634 | 1X |
| 22 | 2912 | | 22 | 3346 | 15 | 22 | 3780 | | 22 | 4214 | 1X | 22 | 4648 | |
| 23 | 2926 | 15 | 23 | 3360 | | 23 | 3794 | 1X | 23 | 4228 | | 23 | 4662 | 2 |
| 24 | 2940 | | 24 | 3374 | 1X | 24 | 3808 | | 24 | 4242 | 2 | 24 | 4676 | |
| 25 | 2954 | 1X | 25 | 3388 | | 25 | 3822 | 2 | 25 | 4256 | | 25 | 4690 | 3 |
| 26 | 2968 | | 26 | 3402 | 2 | 26 | 3836 | | 26 | 4270 | 3 | 26 | 4704 | |
| 27 | 2982 | 2 | 27 | 3416 | | 27 | 3850 | 3 | 27 | 4284 | | 27 | 4718 | 4 |
| 28 | 2996 | | 28 | 3430 | 3 | 28 | 3864 | | 28 | 4298 | 4 | 28 | 4732 | |
| 29 | 3010 | 3 | 29 | 3444 | | 29 | 3878 | 4 | 29 | 4312 | | 29 | 4746 | 5 |
| 30 | 3024 | | 30 | 3458 | 4 | 30 | 3892 | | 30 | 4326 | 5 | 30 | 4760 | |
| 31 | 3038 | 4 | 31 | 3472 | | 31 | 3906 | 5 | 31 | 4340 | | 31 | 4774 | 6X |

The middle column B of the table indicates the time lapsed since an arbitrary beginning of operation of both the main frame and the multiplexing channel adapter. The left hand column A indicates which low speed line of the multiplexing channel adapter is scanned under control of oscillator 36. The right hand column C indicates which one of the high speed terminals of the main frame is being scanned under the control of the oscillator 34. For example, 98 microseconds after the start of operation, low speed line LS–L7 and high speed line HS–L4 are simultaneously scanned. Since the multiplexing channel adapter is connected to only three of the high speed lines HS–L1, HS–L6 and HS–L11, the low speed lines are connected to the main frame only when one of these three high speed lines is sampled by the main frame. This is shown by an X next in column C whenever one of the three high speed lines HS–L1, HS–L6 and HS–L11 is sampled. For simplicity, looking only at high speed line HS–L1, this line "sees" low speed line LS–L1 at time 14, low speed line LS–31 at time 434, low speed line LS–30 at time 854, etc. It is evident that high speed line HS–L1 will see a different one of the low speed lines every 420 microseconds. The particular low speed line which high speed line HS–L1 sees is always numbered one lower than the one that it saw previously. The multiplexing channel adapter is also connected to high speed line HS–L6 which during successive operations (starting at time 154) sees low speed lines LS–L11, LS–L10, LS–L9, etc. High speed line HS–L11 is the third one connected to the multiplexing channel adapter. During successive operations (starting at time 294), it sees low speed lines LS–L21, LS–L20, LS–L19, etc. Thus, during one scan of the high speed lines HS–L1 through HS–L15, three of the low speed lines LS–L1 through LS–L31 will be connected to the main frame. During the first high speed scan, low speed lines LS–L1, LS–L11 and LS–L21 will be connected to the main frame via high speed lines HS–L1, HS–L6 and HS–L11. During the next scan of the high speed lines, low speed lines LS–L31, LS–L10 and LS–20 will be connected to the main frame. Therefore, after about ten (10.33) scans of the high speed lines, every one of the low speed lines will have been connected to the main frame. From the foregoing, it is obvious that if the multiplexing channel adapter had been connected to only one of the high speed lines, thirty-one scans of the high speed lines would have been required to connect each one of the low speed lines to the main frame. On the other hand, if all of the high speed lines were connected to the same multiplexing channel adapter, it would only take about two (2.33) scans of the high speed line to connect all of the low speed lines to the main frame.

Referring again to FIGURES 3*a* through 3*d*, each one of the low speed lines LS–L1 through LS–31 is assigned a control word CW1 through CW31 stored in the multiplexing channel adapter storage 40 and also in the main frame storage 31. The address register 39 selects control words from the multiplexing channel adapter storage 40 under control of the oscillator 36 in synchronism with the scanning of the low speed lines. Further, the address register 39 selects a corresponding control word CW1 through CW31 from the main frame storage 31 via the address register 33 whenever the multiplexing channel adapter is connected to the main frame. This connection occurs, as explained above with reference to the table, whenever one of the three high speed lines HS–L1, HS–L6 and HS–L11 is scanned. The contents of the address register 39 are sent to the main frame address register 33 via one of the gates G′1, G′6 or G′11 whenever the address counter 35 is set to either T′1, T′6 or T′11. High speed control words CW′2 to CW′5, CW′7 to CW′10 and CW′12 to CW′15 associated with high speed lines not connected to the MCA are accessed as times T′2 to T′5, T′7 to T′10 and T′12 to T′15. In summary, whenever a low speed line is scanned under control of the oscillator 36 a corresponding line control word in the multiplexing channel adapter storage 40 will be accessed. In addition, if the particular low speed line being scanned is at this time to be connected to the main frame, the corresponding low speed control word in the main frame storage will also be accessed. In other words, each low speed line has associated with its two control words, one of which (in the MCA storage 40) is accessed every time the low speed line is scanned, and the other one of which (in the main frame storage 31) is accessed at less frequent intervals. The purpose of the multiplexing channel adapter control word stored in the multiplexing channel adapted storage 40 is to receive single bits from the low speed lines, or from the main frame, and hold the bit until such time that it can be transferred to the main frame, or to the line. The main frame control words are used to assemble (during reception) bits received from the multiplexing channel adapter (and high speed terminals) or to act as a source of bits (during sending).

The utilization of the main frame high speed control words CW′1 through CW′15 explained in detail in the Tomasulo et al. application referenced above will, for convenience, be generally described here. Each control word CW′1 through CW′15 in the main frame storage 31 is normally accessed and placed in the data register 32 whenever the corresponding one of the high speed lines is scanned under control of the oscillator 34. The control words CW′1, CW′6 and CW′11 of those high speed lines HS–L1, HS–L6 and HS–L11 assigned to a multiplexing channel adapter are not used since the corresponding address counter 35 outputs T′1, T′6 and T′11 are not connected to the address register 33. Thirty-one additional control words CW1 through CW31 in the main frame storage 31 are assigned to the low speed lines LS–L1 through LS–L31 associated with the connected multiplexing channel adapter. Thus, the control word read from the main frame storage 31 into the data register 32 will in the case of the three high speed lines HS–L1, HS–L6 and HS–L11 correspond to the one of the 31 low speed lines which is at that time scanned by the multiplexing channel adapter. The address of the low speed control word to be read is transferred from the multiplexing channel adapter address register 39 via the common bus 42 and the multiplexing channel adapter address bus 43 to the address register 33 whenever the gate 44 is operated. The gate 44 is operated by the address counter 35 whenever the oscillator 34 attempts to scan one of the three high speed lines HS–L1, HS–L6 and HS–L11 connected to the multiplexing channel adapter.

Each one of the 43 control words in the main frame storage 31 is divided into a number of fields. One of these fields in each control word is designated as an assembly area for receiving bits from the multiplexing channel adapter or for sending bits to the multiplexing channel adapter. During receiving operations, bits are received one at a time from the common bus 42 on line 51 whenever the gate 45 is enabled. The received bit is entered into a fixed position of the assembly area and is then shifted one position to make room for the next bit. Eventually a full character comprising the serially received bits will be stored in the assembly area of the control word. During sending operations the assembly area is initially loaded with a character which is transmitted bit by bit from a fixed position of the assembly area to the bus 42 via a data out lines 55 and 48 whenever the gate 49 is enabled. After each transmission of a bit, the contents of the assembly area will shift one position so as to make another bit available. A send/receive (S/R) field in each control word indicates whether the control word is being used for sending or receiving. A fractonal stop bit (FSB) field in each control word is used during sending operations to indicate the transmission of elongated stop bits in the telegraph code. A last timing bit (LTB) field in each control word is changed whenever a new bit has been received or is to be sent. During reception of bits from the multiplexing channel adapter, the LTB field conditon will be changed via line 50 from the common bus 42 to indicate that a new bit is present on the data in line 51 from the common bus 42. The Exclusive-OR circuit 52 recognizes that the condition specified by the line 50 is the opposite of the condition previously stored in the LTB field of the control word in the data register operating AND circuit 45 via line 53. This causes the bit present at data in line 51 to be entered into the assembly area of the current control word of the data register 32. After a delay determined by the delay circuit 54, the LTB field will be changed to conform with the signal on the line 50. During sending, the LTB field is changed via circuitry in the multiplexing channel adapter (which will be described below) indicating that a new bit is required by the multiplexing channel adapter. This change is applied via the line 50 causing the Exclusive-OR circuit 52 to enable the AND circuit 49 via the line 53, gating the bit from the assembly area to the data out bus 48 on the line 55. In the main frame storage 31 all control words (high speed and low sped) have the same format.

In the multiplexing channel adapter storage 40, the control words comprise seven distinct fields, each of which are different from those in the main frame. The data bit field in each one of the 31 multiplexing channel adapter low speed control words is used during reception to store a bit from the correspondig one of the low speed lines, and during transmission to hold a bit received from the main frame prior to transmission on one of the low speed lines. The last data sample (LDS) field stores the condiiton, during the previous scan, of the currently scanned low speed line. A change in this condition during the current scan is used for synchronizing purposes, as will be explained. The send/receive (S/R) field is used to indicate whether the associated line is being used for transmission or for reception, a one bit indicating transmission and a zero bit indicating reception. The last clock sample (LCS) field records the state of a synchronizing oscillator 58, 59 or 60 during the previous scan of the associated low speed line. The sample counter field stores the value indicated by a counter 56, thus recording the progress of the signal being received on the associated line or being transmitted on the associated line. The timing bit (TB) field indicates by a change in its contents that a complete bit has been received from the associated line during reception or from the main frame during transmission. The fractional stop bit (FSB) field indicates that the data bit in the data bit field is a stop bit in the telegraph code. It is obvious that additional fields may be provided. For example, each control word may be provided with a field which enables selection of a different one of three synchronization oscillators 58, 59 and 60. Since each one operates at a different rate, the bit rate accommodated by a line may be changed by specifying a different oscillator in its control word. In summary, each one of the fields of the 31 low speed control words stored in the multiplexing channel adapter storage 40 records the condition of circuitry associated with the data register 41 at the time at which it was last removed from the storage 40. Thus, one common set of circuitry serves 31 lines simultaneously.

The counter 56 may indicate by means of signals a count of six on line C6, a count of ten on line C10 and a count of fourteen on the line C14. The counter 56 is incremented by a signal on the line step one and is reset to the count one by a signal at the reset input. Whenever a control word is brought into the data register 41, the counter 56 assumes the count indicated by the sample counter field of the control word. Whenever a control word in the data register 41 is replaced in the multiplexing channel adapter storage 40, its sample counter field indicates the contents of the counter 56 at the time of replacement. The counter 56 is incremented by a signal on the step one line applied via an Exclusive-OR circuit 57 which receives signals on a synch line from one of three oscillators 58, 59 and 60. One of the oscillators 58, 59 and 60 is selected by enabling a corresponding one of the gates 61, 62 or 63 as a result of the application of a signal on one of the select lines 64, 65 and 66, which may be accomplished in accordance with a control word field as described above. The signals from the selected oscillator are also applied via a gate 68 to the LCS field of the current control word in the data register 41, which stores the polarity of the selected oscillator signal during the previous scan of the associated line. If the polarity during the current scan as indicated on the synch line is different than the polarity during the previous scan, as indicated by the LCS field, there will be opposite value inputs to the Exclusive-OR circuit 57 when the gate 67 is operated by the clock 37 at time $t4$. As a result, a change in the synch signal will cause the counter 56 to be incremented. Subsequently, at time $t5$, the gate 68 will cause the LCS field to assume the current polarity of the oscillator. If the oscillator has not undergone a change, there will be no change in either the counter or the LCS field. The counter 56 may be reset to the value one in any one of three cases via signals to the OR circuit 69. In the first case, during reception of bits from the low speed lines, the counter 56 is reset at time $t4$ through the gate 70 after it contains a count of ten. During transmission of bits on the low speed lines, the counter 56 will normally also be reset at time $t4$ via the gate 70 after it reaches a count of ten. However, the reset occurs differently during transmission of an elongated stop bit which is indicated by a one bit in the FSB field of the current control word. In this second case the gate 71 emits a signal which is inverted by the inverter 72 to block operation of the gate 70, and enable the AND gate 73 which resets the counter 56 to the value one when the count reaches the value fourteen. In a third case, the counter is reset to the count one when the Exclusive-OR circuit 74 recognizes that the polarity of the data signal being received on the currently scanned low speed line is not the same as the polarity of the previously received signal stored in the LDS field. The last data sample field is examined, by enabling of gate 76, whenever the clock 37 indicates time $t4$. If the data sample from the previous scan cycle is different from the current data sample sensed on line 77, the Exclusive-OR circuit 74 will emit a signal which passes through the gate 76 and the OR circuit 69, causing the counter 56 to be reset to the value one. The LDS field is updated to represent the current data polarity of the line corresponding to the current control word by means of the gate 78 which is enabled at the time $t5$.

The contents of the LDS field are also monitored for use in generating an elongated stop-bit during data transmission. If the contents of the LDS field are zero then the inverter 79 will generate a signal on the line $LDS=0$, which enables the gates 71 and 73. Assuming that a stop-bit is to be generated, the output of the inverter 72 blocks operation of the gate 70 when the counter contains a ten and enables the gate 73 for operation when the counter contains the value fourteen. As a result, toward the end of a character having a stop-bit, the counter will be reset when it contains the value fourteen, instead of the value ten. If the data bit preceding the stop bit (the stop bit is in standard practice a zero bit) is a one bit, then the counter will be reset at the value fourteen during the generation of the stop-bit. If, however, the data bit preceding a stop bit is a zero bit, then the counter will be reset at the value fourteen during the transmission of the bit preceding the stop bit, and not during the transmission of the stop bit itself. This, however, is not objectionable since the total duration of the last data bit and the stop bit will be the same in either case.

The counter 56, when it reaches the value six places a signal on the line C6 which is used to sample data from a low speed line to the data bit field of the corresponding control word in the data register 41, or from the data bit field to the corresponding low speed line. Which of these occurs depends upon whether the line is in send or receive satus as indicated by the S/R field which is set by the main frame via gate 80 and $t7$. If the S/R field contains a one there will be a signal from output $S/R=1$ of convert block 81 indicating that the corresponding line is in send status. If the line is in receive status the field will contain a zero which causes the line $S/R=0$ of convert block 81 to have a signal applied to it. If a line is in receive status, gate 82 will be enabled when the corresponding control word is placed in the data register 41. If during a current scan of a line the counter 56 is stepped to the value six then at clock time $t6$ the data from the currently scanned low speed line, appearing on the common receive line 84, will be passed through the gate 82 to the data bit field of the current control word in the data register 41. If a line corresponding to the current control word in the data register 41 is in send status, then gate 83 will be enabled. If during this scan cycle counter 56 is stepped to the value six, then at clock time $t6$ the contents of the data bit field of the control word will be removed from the data register 41 and will be sent to the currently scanned low speed line via the common send line 85. For simplicity, the triggers 6 and 28 in FIGURE 1 are not redrawn in FIGURE 3*a*.

Data bits entered into the data register 41 are made available to the main frame by enabling gate 86 at $t7$, which sends the bit onto the data in line 51 of the bus going to gates G′1, G′6 and G′11 of the main frame. Similarly data available from the main frame appears, during send operations, on the data out line 48, which is sampled at time $t7$ through the gate 87 into the data bit field of the data register 41. Therefore whenever a corresponding main frame low speed control word contained in the main frame storage 31 and multiplexing channel adapter low speed control word in the multiplexing channel adapted storage 40 are accessed, there may be a transfer of a bit between the control words. It is necessary during receive operations to indicate to the main frame, when the main frame accesses a low speed control word corresponding to a multiplexing channel adapter line control word, that a received data bit is available on the data in line 51 or that a new data bit is requested by the multiplexing channel adapter. This is accomplished by gate 88 which at time $t7$ reverses the TB field of the current control word in the data register 41 whenever a new bit is placed on the data in line 51 to the main frame or whenever a new bit is desired from the main frame. When the main frame senses the reversal of the TB field it will enter the new data into its corresponding control word assembly area if the control word is in receive status. During transmission of data the same operation is performed, the recognition of a TB field transition by the main frame this time resulting in the transfer of a bit from the main frame to the data bit field of the control word in the multiplexing channel adapter data register 41.

The operation of the apparatus shown in FIGURES 3*a*, 3*b* and 3*c* will now be described with reference to the pulse diagrams of FIGURES 4*a* and 4*b*. FIGURE 4*a* shows the pulses present in the apparatus during the reception of signals on low speed line LS–L1 and FIGURE 4*b* shows the pulses present during the transmission of signals on low speed line LS–L2. A control word is provided for both of these low speed lines in the multiplexing channel adapter storage 40 and in the main frame storage 31. In this description it will be assumed that the proper control word is placed into the multiplexing channel adapter data register 41 and the main frame data register 32 at the proper times, and that the multiplexing channel adapter oscillator 36 is operated at a rate greater than that of the main frame oscillator 34. Each one of the 31 low speed lines LS–L1 through LS–L31 is scanned by the multiplexing channel adapter once every .434 millisecond, and by one of the three connected main frame high speed lines HS–L1, HS–L6 and HS–L11 once every 4.34 milliseconds. Therefore, since the main frame is connected to any one particular low speed line every 4.34 milliseconds and received bits are 5 milliseconds in length, every low speed line will be connected to the main frame at least once during the duration of a bit on the line.

Referring first to FIGURE 4*a*, there are shown the signals present on low speed line LS–L1 during reception of bits of 5 milliseconds duration. The oscillator 58 is assumed to be selected by a signal on the line 64 which connects the oscillator 58 to the multiplexing channel adapter via the gate 61. For purposes of illustration, it is assumed that this oscillator is in synchroni m with the incoming signal from the line LS–L1, supplying ten synch signals during each received bit time. The scan oscillator 36 is however out of synchronism with the incoming signal, successive scans of line LS–L1 occurring at intervals of .434 millisecond. Each pulse of the scan oscillator 36 results in a sample being taken of the current synch oscillator 58 signal. This value is placed into the last count sample (LCS) field of the multiplexing channel adapter control word CW' for line LS–L1 when it is scanned. The counter 56 is stepped one every time that there is a transition in the LCS field as indicated by the output of Exclusive-OR circuit 57. The polarity of a signal on a line LS–L1 is recorded in the last data sample (LDS) field during each scan. If there is a transition in the LDS field the counter 56 is reset to the value one. The line LS–L1 is sampled, by operation of the gate 82 whenever the counter 56 has a value six, at which time also the last timing bit (LTB) field of the line LS–L1 control word is reversed. The low speed line LS–L1 is connected to the main frame by one of the gates G'1, G'6, and G'11 once every 4.34 milliseconds. At this time the corresponding main frame control word CW1 for line LS–L1 is placed in the data register 32. If the LTB field of the main frame control word CW1 for line LS–L1 is different than the current TB field of the multiplexing channel adapter line control word CW1 in the data register 41, then the data bit field of the multiplexing channel adapter line control word CW1 in the data register 41 will be sampled into the main frame control word CW1 in the data register 32 assembly area via gate 45.

Initially, the scan oscillator 36 will set the clock 37 to time *t*1 resetting the multiplexing channel adapter data register 41 and causing the address counter 38 to enter the address of the line LS–L1 control word CW1 into the address register 39. Gate G1 is operated at this time also by the multiplexing channel adapter address counter 38, causing line LS–L1 to be connected to the common read line 84. The address regis er 39 places a signal on the line CW1 which causes the multiplexing channel adapter control word CW1 for line LS–L1 to be accessed.

The next cycle of the scan oscillator 36 causes the clock 37 to step to time *t*2. At time *t*2 the line LS–L1 control word CW1 is read from the multiplexing channel adapter storage 40 via the read out gate and is entered into the multiplexing channel adapter data register 41. The contents of the multiplexing channel adapter data register 41 are regenerated in the multiplexing channel adapter storage 40 by operation of the write in gate at time *t*2. The contents one of the sample counter field of the line LS–L1 control word are placed in the counter 56. The S/R field of the control word is zero, indicating a receive operation, causing the line $S/R=0$ of the Convert block 81 to have a signal placed on it. The LCS field is at this point zero as are the LDS field and TB field.

At clock time *t*4 the LCS field is sampled via gate 67, the LDS field is sampled via gate 76 and the count ten output C10 of the counter 56 is sampled via gate 70. The synch oscillator 58 output is a one which is different than the zero initially stored in the LCS field of the control word CW1 for line LS–L1. As a result there is an output from the Exclusive-OR circuit 57 which attempts to increase the counter (which contains a one) by one. The current data signal is a one, whereas the previous data signal recorded in the control word CW1 for line LS–L1 was a zero. Therefore, there will be an output from the Exclusive-OR circuit 74 causing the counter to be reset to one, nullifying the step one signal.

At clock time *t*5 gates 68 and 78 are operated causing the LDS field to assume the current state (one) of the line LS–L1 and the LCS field to assume the current state (one) of the synch oscillator 58.

At clock time *t*6 the gate 82 is enabled, but no output can emerge since the counter is not set to the value six at this time.

At clock time *t*7 the gate 86 makes the contents of the data bit field of the control word in the data register 41 available to the data in line 51 of the main frame. The main frame at this time, however, is not connected to the multiplexing channel adapted so that the signal is not used.

At clock time *t*8 the control word CW1 for line LS–L1 is re-entered into the multiplexing channel adapter storage 40 via the write-in gate.

When the clock 37 again indicates time *t*1 the address counter 38 will cause the control word for line LS–L2 to be placed into the address register 39. The use of this control word will be explained later with reference to FIGURE 4*b*. During subsequent times that the clock 37 indicates time *t*1 control words for lines LS–L3 through LS–L31 will be brought out of the storage 40. The operations performed will be similar to those explained with reference to line LS–L1 (for receiving) and LS–L2 (for sending). Eventually the clock 37 will specify time *t*1 for the 32nd time, causing the address counter 38 to indicate the address for the line control word CW1 of line LS–L1. This is shown in FIGURE 4*a* as the second multiplexing channel adapter scan of line LS–L1. The control word CW1 for line LS–L1 will be read out to the data register 41 as previously described, with field contents exactly as they were stored during the previous scan.

During the second scan of the line LS–L1 the counter 56 will again be set to the value one as indicated by the sample counter field. The LCS field indicates the value one as does the LDS field. The TB field is still zero. At clock time $t4$ the LCS field one is compared with the current signal (one) from the synch oscillator 58. These are equal so that there will be no output from the Exclusive-OR circuit 57, the counter 56 remaining set to the value one. The LDS field (one) is compared with the current signal (one) on line LS–L1 at time $t4$ also. The value of the LDS field one is the same as a signal (one) on line LS–L1 so that no signal will emerge from the Exclusive-OR circuit 74 or from the AND circuit 76, the counter 56, therefore, not being reset. At time $t5$ the gate 68 will connect the oscillator 58 synch signal (one) to the LCS field which field will as a result remain set to one. At time $t5$ the LDS field (one) is connected to the line LS–L1 (which has a one signal on it) via the gate G'1 and the gate 78, the field remaining set to one. At clock time $t8$ the control word for line LS–L1 is again stored in the storage 40 as updated. Subsequent lines are scanned and their corresponding control words are operated upon in a similar manner. The control word for line LS–L1 will again be called for after all the other lines are scanned.

During the third scan of line LS–L1 its control word is again entered into the data register 41 at clock time $t2$. The counter 56 will receive the contents (one) of the sample counter field of the control word placed into the data register 41. Since the current value (zero) of the synch signal is different than the synch signal (one) stored in the LCS field during the second scan of line LS–L1, the counter will be increased by one, to indicate the value two.

During subsequent scans of the line LS–L1, its control word will be repeatedly brought into the data register 41. The counter 56 will cause the sample counter field to be increased each time that the LCS field bit differs from the current synch signal. When the value in the counter 56 is increased to six the gates 82 and 88 will be enabled. Therefore, at time $t6$ the gate 82 will pass the one bit on line 84 and enter it into the data bit field of the control word CW1 in the data register 41. Subsequently, at time $t7$, the TB field of that control word will be reversed by action of the gate 88 which supplies a one-bit if the TB field is zero, and a zero bit if the TB field is a one-bit. Also, at time $t7$ the gate 86 makes available the one-bit in the data bit field of the register 41 to the line 51.

When the counter 56 has been stepped to indicate the value ten, for example at scan twelve, the gate 70 will, during the next scan, be enabled since the invert block 72 output supplied to the gate 70 is one during receive operations. The output of the gate 70 is applied to the reset input of the counter 56 via the OR circuit 69 at time $t4$. As a result, the counter is reset to the value one.

During subsequent scans of the line LS–L1 the counter is repeatedly stepped up from the value one. At scan sixteen, when the counter 56 reaches the value three for the second time, the main frame scans the line LS–L1. At this time the main frame line control word CW1 for low speed line LS–L1 appears in the data register 32. At time $t7$ the main frame senses that a new bit is available on the data in line 51 since the LTB field of the main frame line control word CW1 for LS–L1 was zero the last time that it was scanned by the main frame, and the TB field of multiplexing channel adapter control word CW1 is now one. The Exclusive-OR circuit 52 has an output as a result of this change which enables the gate 45. Therefore, at time $t7$ the gate 86 passes the one-bit previously stored in the data register 41 through the line 51 and the gate 45 to the assembly area of the data register 32. After a time delay determined by the circuitry 54 the TB field of the main frame line control word CW1 in the data register 32 is made to agree with the TB field of the control word CW1 in the multiplexing channel adapter data register 41.

Subsequent scans 25 through 48 of the line LS–L1 are similar to the ones just described. Whenever the count contained in the counter 56 equals six the data bit field of the control word CW1 in the data register 41 is made to agree with a signal on the line 84 and the TB field is reversed. The next time that the main frame is connected to the low speed line LS–L1 via one of the high speed lines HS–L1, HS–L6, and HS–L11, this change in the TB field is noted by the Exclusive-OR circuit 52 and the data bit from the line 84 is transferred from the data bit field of the multiplexing channel adapter data register 41 to the assembly area of the main frame data register 32. Whenever the counter 56 contains the value ten the counter is reset to the value one. In this way the positive signal formed by two abutting one-bits are transferred to the main frame data register 32 assembly area as two separate one-bits.

Referring now to FIGURE 4*b*, the sending of bits from the main frame through the multiplexing channel adapter to low speed line LS–L2 will not be described.

During the first scan of line LS–L2 its control word CW2 is entered into the data register 41 at clock time $t2$. The data bit field of this control word contains a zero-bit to be sent on line LS–L2. The LDS field is not used. The S/R field contains a one, indicating that this is a transmission operation. The LCS field contains a zero, indicating that the synch signal from the synch oscillator 58 during the last scan of line LS–L2 was a zero. The sample counter field contains the value nine. The TB field has the value zero stored in it. The contents of the sample counter field are placed in the counter 56. At time $t4$ the LCS field (zero) is passed through the gate 67 into one side of the Exclusive-OR circuit 57. The synch oscillator 58 which is applied to the other input of the Exclusive-OR circuit 57 has the value one. As a result, there will be an output from the circuit 57 causing causing counter 56 to be stepped to the value ten. The LCS field is adjusted to one at time $t5$.

During the second scan of line LS–L2 its control word CW2 is entered into the data register 41 at clock time $t2$. Its sample counter field (ten) is placed into the counter 56. Since the value in the counter 56 is now equal to ten, one of the inputs to the gate 71 is enabled. The FSB field of the control word in the data register 41 is currently zero causing one of the inputs to the gate 71 to be missing. Thus, there is an output from the invert circuit 72. Since both inputs to the gate 70 are present, the counter 56 will be reset to the value one via the OR circuit 69. The counter 56 will not be stepped during this scan of the line LS–L2 because the LCS field has stored in it a signal (one) corresponding to a synch signal (one) of the current scan. Since there was no change in the synch signal between two successive scans, there is no counter step output from the circuit 57.

During subsequent scans of the line LS–L2 the counter will be increased whenever the LCS field of the control word in the data register 41 differs from the current value of the synch signal from the synch oscillator 58.

During scan nine, when the counter 56 reaches the value six, the gates 88 and 83 will be enabled. At time $t6$ the contents (zero-bit) of the data bit field of the line LS–L2 control word CW2 in the data register 41 will be sent via the gate 83 and the line 85 to the line LS–L2. At time $t7$ the TB field of the control word CW2 will be reversed (to one) by the gate 88 as previously described. Reversal of the state of the TB field indicates that bit has been seen sent on line LS–L2 and that a new bit must be obtained from the main frame.

During the twelfth multiplexing channel adapter scan of the line LS–L2 the main frame scans the multiplexing channel adapter. The main frame line control word CW2 for low speed line LS–L2 is placed in to the MF data register 32. Due to the transmission of a data bit from multiplexing channel adapter data register 41, the TB field (one) of the control word CW2 in the multiplexing channel adapter data register 41 has been changed and therefore differs from the LTB field (zero) of the control word in the data register 32. The Exclusive-OR circuit 52 detects this difference and enables gate 49 which transfers a new bit (one-bit) from the assembly area of the data register 32 via line 55, gate 49, line 48 and gate 87 into the data bit field of the data register 41. After a delay determined by the circuit 54 that LTB field of the control word in the data register 32 is made to agree with the TB field of the control word in the data register 41.

During scan thirteen of the line LS–L2 the counter reaches value ten, it being reset to the value one during the next scan. At scan twenty-one, when the counter again reaches the value six, the new bit in the data bit field of the data register 41, which is a one-bit, will be sent on the line LS–L2 as previously described and the TB field will be reversed (to zero). During the next connection of the main frame to the line LS–L2, which occurs at scan twenty-two of the low speed line LS–L2, the discrepancy between the TB field of the multiplexing channel adapter control word CW2 in the data degister 41 and the LTB in the corresponding MF control word CW2 in the data register 32 will be noted and a new bit will be transferred from the assembly area of the MF data register 32 into the data bit field of the multiplexing channel adapter data register 41. The new bit transferred at scan 22 is a stop bit, the FSB field of the data register 32 being set to the one state, which state is transferred via the FSB line to the FSB field of the multiplexing channel adapter data register 41.

The counter is repeatedly stepped until it again reaches ten at scan twenty-five, it being reset to the value one during the next scan. This occurs despite the presence of a one in the FSB field because the LDS field, which indicates the last bit (one-bit) sent, is in the one state. As a result, the gate 71 will be blocked by the invert circuit 79, and the gate 70 will be enabled whereas the gate 73 is disabled—even though the FSB field is set to the one state. (If the previous bit in the data bit field of the data register 41 had been a zero bit then the LDS field would have been set to the zero state. In this case, gate 73 would have been enabled and gate 70 would have been disabled, causing the counter to count to the value fourteen before resetting.)

The main frame scans the multiplexing channel adapter line LS–L2 during multiplexing channel adapter scan thirty-two. Since no change has occurred in the TB field of mutiplexing channel adapter control word CW2 no new bit will be sent from MF control word CW2. No other changes occur at this frame.

When the counter reaches the value six again at scan thirty-three the current bit (stop bit) in the data bit field of the data register 41 will be sent on line LS–L2. The TB field will be changed (to one) to indicate that another bit is to be transferred into the data bit field. The counter 56 is increased by one repeatedly. It is not reset after it reaches the value ten at scan 37 because the gate 71 and inverter 72 block the gate 70. This occurs because the previous bit (stop bit) sent on line LS–L2 had the value zero, which value is now stored in the LDS field. The value of the LDS field is inverted by the circuit 79 to enable gate 73. Therefore, since the FSB field is still set to the one state, the counter 56 is not reset via the OR circuit 69 until the counter 56 reaches the value fourteen. This occurs at scan forty-two of the line LS–L2, at which time the main frame scans the multiplexing channel adapter, causing the next bit (start bit) to be transferred to the data bit field of the control word CW2 in the multiplexing channel adapter data register 41. Since the start bit if of normal length, the FSB field of the data register 32 will now be set to the zero state causing the FSB field of the data register 41 to assume the zero state. The start bit will be sent the next time that the counter 56 reaches the value six at scan forty. Thus, the stop bit and the starb bit are separated by a period 40% longer than that separating the other bits sent on the line LS–L2. Note that this separation may be the result of an elongation of either the stop bit or of the bit preceding the stop bit in the case when the preceding bit is a zero. It does not matter where the elongation occurs in the case of two abutting zero valued bits.

There has been generally described a device for synchronizing a processor and a plurality of terminals during the interchange of data. This device, during reception, permits the sampling of randomly arriving signals at their approximate center. During transmission, this device permits the length of signals to be controlled. In more detail, there has been described apparatus, using the invention, for linking a main frame which scans a plurality of high speed lines to a plurality of low speed lines scanned by a multiplexing channel adapter which is connected to several of the high speed lines. Control words are allotted to each low speed line in both the multiplexing channel adapter and in the main frame. Information is transferred between the multiplexing channel adapter and the main frame when the control words coincide. As a result, it is not necessary to provide separate control circuitry for each one of the low speed lines.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. Information transfer apparatus, comprising:

a line for receiving in a receiving mode, and sending in a sending mode, binary signals each signal being representative of an information element;

line storage means, connected to said line, for storing at first intervals as states a number of information elements, received from said line in said receiving mode and to be sent on said line in said sending mode, said line storage means including control means for storing at said first intervals as a state a first timing signal which is reversed whenever a signal is received by said line storage means in said receiving mode and whenever a signal is sent by said line storage means in said sending mode;

message storing means, connected to said line storage means for storing at second intervals, coinciding with some of said first intervals, as states a plurality of information elements received from said line storage means in said receiving mode and to be sent to said line storage means in said sending mode, said message storage means including control means for storing as a state a second timing signal;

comparison means connected to said line storage means and to said message storage means operable during said second intervals to compare said first timing signal stored in said line control means with said second timing signal stored in said message control means and for generating a comparison signal when the timing signals are stored as different states;

gating means connected to said comparison means, said message storage means and said line storage means operable by said comparison signal for transferring during said second intervals information elements between said line storage means and said message storage means; and means operable after the transfer of said elements for changing the state of said second timing signal to agree with the state of said first timing signal.

2. Information transfer apparatus, comprising:

a number of lines each capable of receiving in a receiving mode, and sending in a sending mode, binary signals representative of information elements, line storage means having a plurality of locations a number of which are assigned to said lines for storing at assigned locations, as states, a number of information elements received from associated lines in said receiving mode and to be sent on associated lines in said sending mode, said line storage means including a plurality of line control means one associated with each of said line storage means locations for storing as a state a first timing signal which is reversed whenever a signal is received by said line storage means in said receiving mode and whenever a signal is sent by said line storage means in said sending mode, message storing means, having a plurality of locations at least one of which is assigned to each of said line storage means locations associated with a line, for storing as states a plurality of information elements received from said assigned line storage means locations in said receiving mode and to be sent to said assigned line storage means locations in said sending mode, said message storing means including a plurality of message control means, one associated with each of said message storage means locations, for storing at intervals as a state a second timing signal;

comparison means connected to said line control means and to said message control means operable during said intervals to compare the first timing signal stored in said line control means locations with the second timing signal stored in corresponding ones of said message control means locations and for generating a comparison signal when the timing signals are stored as different states;

gating means connected to said comparison means, said message storage means and said line storage means, operable by said comparison signal for transferring during said intervals information elements between said corresponding ones of said line storage means locations and message storage means locations; and means operable after the transfer of said elements for changing the state of said second timing signal to agree with the state of said first timing signal.

3. Information transfer apparatus, comprising:

a line for receiving signals each signal being representative of an information element;

line storage means, connected to said line, for storing at first intervals as states a number of information elements received from said line;

said line storage means including control means for storing at said first intrevals as a state a first timing signal which is reversed whenever a signal is received by said line storage means;

message storing means, connected to said line storage means for storing as states at second intervals, coinciding with some of said first intervals, a plurality of information elements received from said line storage means, said message storing means including control means for storing as a state a second timing signal;

comparison means connected to said line storage means and to said message storage means operable during said second intervals to compare said first timing signal stored in said line control means with said second timing signal stored in said message control means and for generating a comparison signal when the timing signals are stored as different states; and, gating means connected to said comparison means, said message storage means and said line storage means, operable by said comparison signal for transferring during said second intervals information elements between said line storage means and said message storage means.

4. Information transfer apparatus, comprising:

a line for sending binary signals each signal being representative of an information element;

line storage means, connected to said line, for storing at first intervals as states a number of information elements to be sent on said line;

said line storage means including control means for storing at said first intervals as a state a first timing signal which is reversed whenever a signal is sent by said line storage means;

message storing means, connected to said line storage means, for storing as states at second intervals coinciding with some of said first intervals a plurality of information elements to be transferred to said line storage means, said message storing means including control means for storing as a state a second timing signal;

comparison means connected to said line storage means and to said message storage means operable during said second intervals to compare said first timing signal stored in said line control means with said second timing signal stored in said message control means and for generating a comparison signal when the timing signals are stored as different states; and, gating means connected to said comparison means, said message storage means and said line storage means, operable by said comparison signal for transferring during said second intervals information elements from said message storage means to said line storage means.

References Cited by the Examiner

UNITED STATES PATENTS

| | | | |
|---|---|---|---|
| 2,843,669 | 7/1958 | Six et al. | 178—69.5 |
| 3,017,610 | 1/1962 | Auerbach et al. | 340—172.5 |
| 3,033,928 | 5/1962 | Biggam et al. | 178—69.5 |
| 3,056,110 | 9/1962 | Cypser et al. | 340—172.5 |

ROBERT C. BAILEY, *Primary Examiner.*

MALCOLM A. MORRISON, *Examiner.*

P. J. HENON, R. ZACHE, *Assistant Examiners.*